J. R. Moffitt,
Heel Stiffener.
No. 96,023.   Patented Oct. 19, 1869.
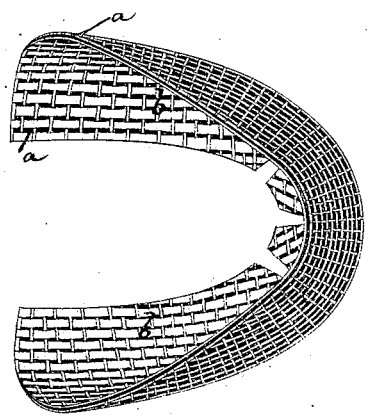
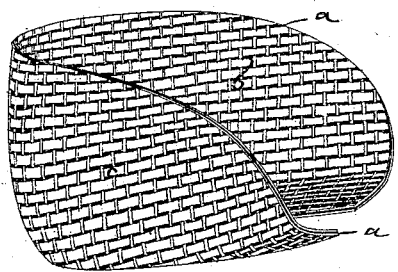
Witnesses
M. W. Frothingham.
C. Warren Brown
John R. Moffitt
by his Attys
Crosby, Halsted & Jones

UNITED STATES PATENT OFFICE.

JOHN R. MOFFITT, OF CHELSEA, MASSACHUSETTS.

IMPROVED HEEL-STIFFENER.

Specification forming part of Letters Patent No. 96,023, dated October 19, 1869.

*To all whom it may concern:*

Be it known that I, JOHN R. MOFFITT, of Chelsea, in the county of Suffolk and State of Massachusetts, have invented an Improved Heel-Stiffener; and I do hereby declare that the following, taken in connection with the drawing which accompanies and forms part of this specification, is a description of my invention sufficient to enable those skilled in the art to practice it.

In the manufacture of boots and shoes, it is customary to use in making each shoe a heel-stiffener, placed between the heel-quarter leather and lining, to keep the quarter from wearing down; and on account of the cost of leather these stiffeners have of late years been to a considerable extent made of other material than leather—such, for instance, as leather-board and pasteboard, and rubber compounds mixed with fibrous material. Stiffeners made wholly of rubber compounds are not reliable, as the rubber soon decomposes under the heat of the feet; nor is a stiffener much better that is made by simply vulcanizing rubber upon one side of a piece of cloth, as the outer rubber surface soon becomes soft. Another objection to rubber is its cost.

In my invention I use no pure rubber as the cementitious and stiffening medium; but I use a cementitious vehicle composed of old rubber compounds ground up with linseed-oil, manganese, and sulphur, which material, under heat and pressure, may be formed into a sort of cloth or paper, which might be appropriately called "rubber shoddy," it having but little cohesion, though it possesses considerable rigidity and body. This material I mold into form between two pieces of coarse cloth, the cloth imparting strength and increasing the rigidity, and forming an outer coating that keeps the cementitious matter from contact with the leather and lining, between which the stiffener is placed in making the boot. It is heel-stiffeners made of such composition, molded between two pieces or sheets of textile fabric, or in a stiffener made of two pieces of coarse textile fabric having a filling of such composition between them. that my improvement consists.

The drawing shows a heel-stiffener embodying my improvement.

$a$ denotes the filling or composition; $c\ b$, the outer and inner coatings or fabrics. The composition filling, having been prepared by grinding up the material and rolling it into sheet form, is cut up into pieces of the proper size, and, being placed between two pieces of the fabric, the three are introduced into a suitable mold, (having the form to be given to the stiffener,) in which, under the action of heat and pressure, produced by a plunger, the fabric is cemented to the composition and the united parts are brought into the requisite shape to form the stiffener, as seen in the drawing. The coarseness of the fabric is such that, while its threads embed well into the composition, the latter does not pass through to the outer surface of the threads, and the composition is thus kept out of direct contact with the leather, and is not subjected to the deteriorating influence of heat, as in other heel-stiffeners in which a rubber compound is used as an ingredient. For this reason the stiffener is as enduring as is the leather of the boot of which it forms a part, never breaking down under common wear.

I claim—

A boot-heel stiffener made of coarse textile fabric molded into form by means of and in connection with a composition filling between the fabrics, substantially as described.

JOHN R. MOFFITT.

Witnesses:
   J. B. CROSBY,
   FRANCIS GOULD.